United States Patent [19]

Steele

[11] 4,264,244
[45] Apr. 28, 1981

[54] DIVERTER VALVES

[75] Inventor: James R. Steele, Stillwater, Minn.

[73] Assignee: Dynamic Air Inc., St. Paul, Minn.

[21] Appl. No.: 23,604

[22] Filed: Mar. 26, 1979

[51] Int. Cl.³ .............................................. B65G 53/56
[52] U.S. Cl. .................................... 406/182; 137/876;
 406/193; 406/195
[58] Field of Search .............. 406/181, 182, 195, 193;
 193/31 R, 31 A; 137/874, 876

[56] References Cited

U.S. PATENT DOCUMENTS

| 362,917 | 5/1887 | Exner | 137/876 |
|---|---|---|---|
| 464,323 | 12/1891 | Evans et al. | 193/31 A X |
| 627,080 | 6/1899 | Miller et al. | 406/182 |
| 2,825,604 | 3/1958 | Sebestyen | 406/182 |
| 4,063,572 | 12/1977 | Anderegg et al. | 406/182 X |

FOREIGN PATENT DOCUMENTS

| 1155057 | 9/1963 | Fed. Rep. of Germany | 406/182 |
|---|---|---|---|
| 2051177 | 4/1972 | Fed. Rep. of Germany | 406/182 |
| 64006 | 9/1968 | German Democratic Rep. | 406/182 |
| 1382347 | 1/1975 | United Kingdom | 406/182 |

Primary Examiner—James L. Rowland

[57] ABSTRACT

A rotor diverter valve operable for diverting materials in a pneumatic conveying line to secondary locations with the rotor diverter valve including a housing and pivotally mounted rotor having a pair of converging passages therein that can direct material from an inlet in the housing to one of a plurality of outlets on the housing through proper position of the rotor within the housing. The housing includes interchangeable inlet and outlet attachments that can be tightly sealed around the converging passages in the rotor.

4 Claims, 6 Drawing Figures

DIVERTER VALVES

BACKGROUND OF THE INVENTION

1. Field of the Invention

This invention relates generally to diverter valves and, more specifically, to improvements to diverter valves.

2. Description of the Prior Art

One of the uses of pneumatic conveying lines is to transport materials from one location to another. Often times, at selected intervals, it is necessary to divert the material into bins or secondary pneumatic conveying systems. To switch or divert the material from the pneumatic conveyer line into a second system requires a pneumatic switch which will divert the material to the secondary outlet or system. The switch must also seal the connection points or junctions of the two systems so the material being transported does not escape into the environment. Because of explosion hazards of many types of dust, it is important that no dust escapes from the switch.

A typical prior art diverter valve is shown in the Sebestyen U.S. Pat. No. 2,825,604. Sebestyen rotates a pipe around an axis to direct material to any one of a number of different outlets. An inflatable seal is located at the junction of the pipe to the valve.

British Pat. No. 229,844 shows a similar type of device using a swiveling curved pipe that communicates with other pipes.

German Offenlegungsschrift No. 2,051,177 discloses "a pneumatic conveyer junction cock seal in which the cock plug has one or more sealing pistons forced by the internal pressure into the sealing position against the outlet not in use. Hydraulic or mechanical pressure can be used to force the pistons into position and to lift them clear when the cock is being operated."

French Pat. No. 74-13,252 shows a retractable seal made from soft rubber or plastic which can be used for sealing around pipes or the like.

The Great Britain Pat. No. 1,382,347 shows a pipeline switch in which the material is conveyed either by gravity or pneumatically to any of a plurality of outlet pipes. The unit uses at least one annular inflatable joint to provide a seal between the pipes.

All of these prior art devices are very similar because they rotate the same pipe to any number of different outlets and provide some type of a seal around the outlet. The present invention provides an improvement to diverter valves through a rotor and sealing arrangements that provide a trouble-free, easy-to-use diverter valve.

One of the problems associated with prior art pneumatic switching devices has been the difficulty in obtaining a good seal at the outlet of the valve. In addition, most prior art valves become rather large and require a large area for installation. Still other problems occur because prior art diverting units must withstand tremendous amounts of wear by forces generated by the fast moving and abrasive materials flowing in the conveyer tubes. The internal forces make it difficult to properly seal the pneumatic conveying tubes to the pneumatic switches. In addition, pneumatic and conveying valves require relatively free nonjamming capability to provide a reliable, trouble-free diverter valve. Another disadvantage of prior art valves is that valves come either with right hand output or left hand output and cannot be interchanged. Furthermore, under certain conditions the annular inflatable seals may blow out causing leakage of material from the pneumatic line.

SUMMARY OF THE INVENTION

Briefly, the invention comprises a two position rotor diverter valve. In one position a rotor having a converging passage diverts the material from an incoming pneumatic line to a first outlet. By turning the rotor 180°, a second converging passage directs the material from the same inlet to a second outlet. The invention further includes interchangeable inlet and outlet seals for maintaining an air-tight seal between the rotor and the diverter valve housing even after repeated and extended use. The housing includes alignment members that insure the rotor will not bind under operating conditions yet allows the rotor diverter valve to operate with low tolerances. In addition, rotor diverter valve easily converts from a left hand outlet to a right hand outlet.

DESCRIPTION OF THE PREFERRED EMBODIMENT

Figure 1:
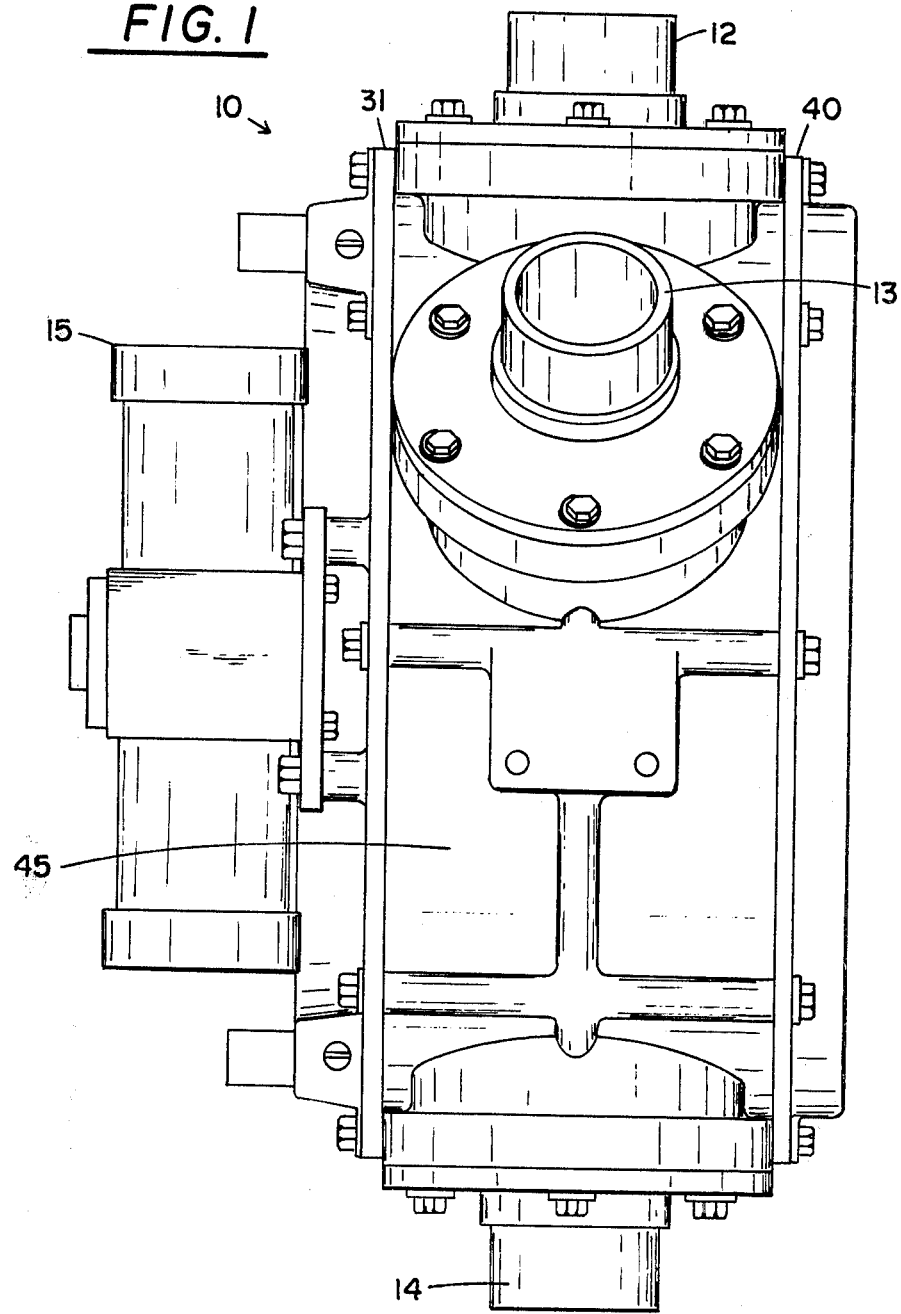
FIG. 1 is a side view of my rotor diverter valve.
Figure 2:
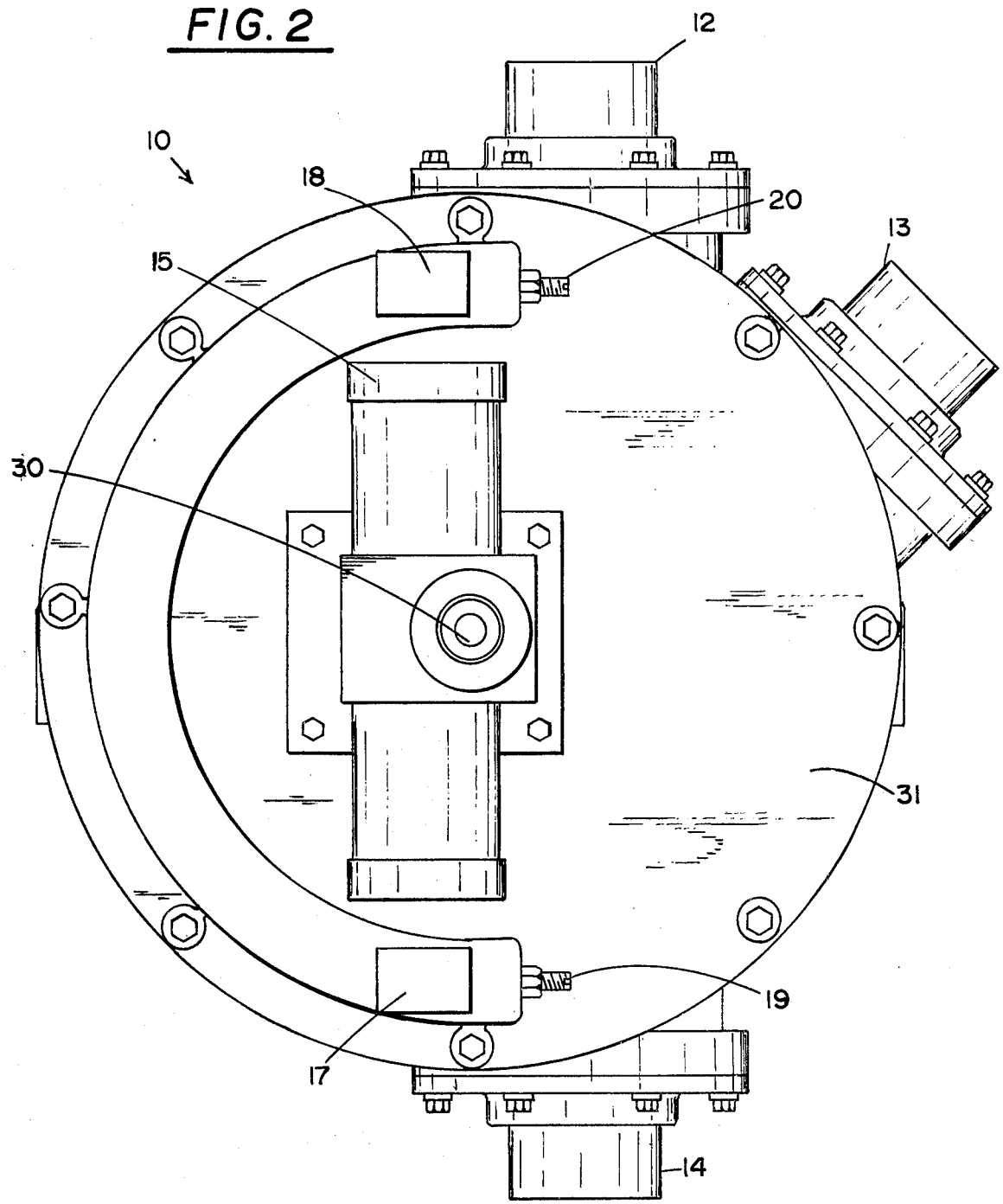
FIG. 2 is a top view of my rotor diverter valve.

Referring to FIGS. 1 and 2, reference numeral 10 generally designates my rotor diverter valve. Rotor diverter valve comprises a cylindrical housing 45 having a circular bottom cover 40 attached to one end of housing 45 and a similar circular top cover 31 attached to the opposite end of housing 45. Projecting from cylindrical housing 45 is a pneumatic conveyer inlet housing 14 and pneumatic conveyer outlet housings 12 and 13. Inlet housing 14 and outlet housings 12 and 13 are identical and interchangeable. Inlet housing 14 and outlet housing 12 and 13 as well as covers 40 and 31 fasten to cylindrical housing 45 through suitable removable fasteners such as bolts or the like. While the bolts are not identified by numerals on the valve, it is apparent that there are numerous removable bolts which are used to assemble valve 10. The use of removable fasteners provides the present invention with versatility and ease of maintenance.

Figure 3:
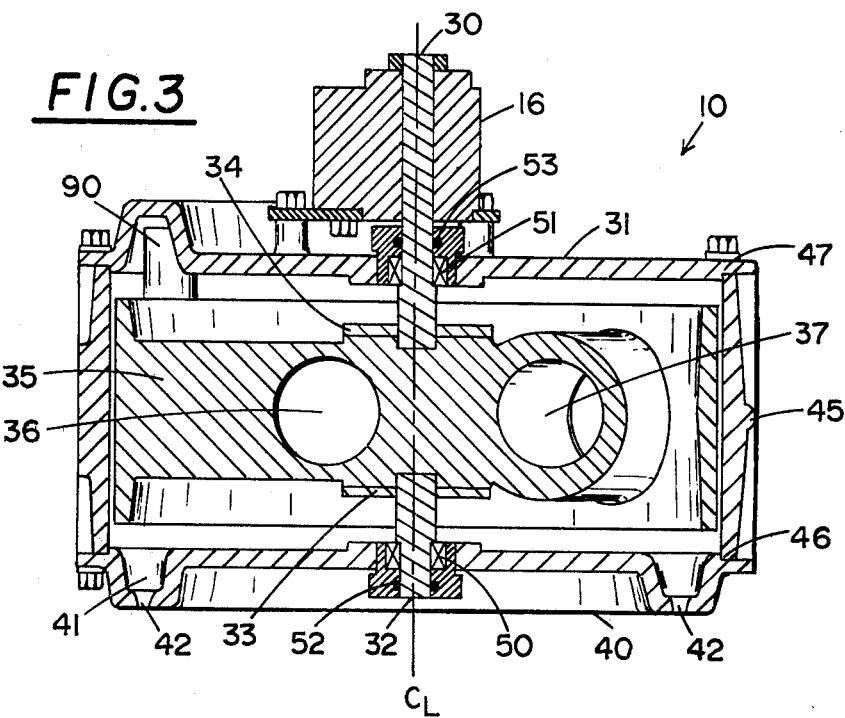
FIG. 3 is a section view of my rotor valve.

FIG. 2 shows a top view of rotor diverter valve 10 and a set of limit switches 17 and 18 and FIG. 3 shows a cut away of rotor 45. Limit switches 17 and 18 alert an operator as to whether rotor 35 is in proper position. A member 90 attaches to rotor 35 and actuates the limit switches when rotor 35 is in proper position. Set screws 19 or 20 provide for minor positioning adjustment of the rotor in valve 10.

Attached to the top housing 10 is a pressure activated member 15 comprising a piston attached to an internal rack and pinion gear arrangement that connects to the rotor in switch 10. A signal to one side of the piston slides a piston within member 15 causing a half revolution of rotor 35, similarly applying a signal to the opposite side causes a half revolution of rotor 35 in the opposite direction. Typically, pressure activated rotating members are commercially available and will not be described herein except to point out that such devices allow a pneumatic signal to produce a physical rotation of rotor 35.

Figure 4:
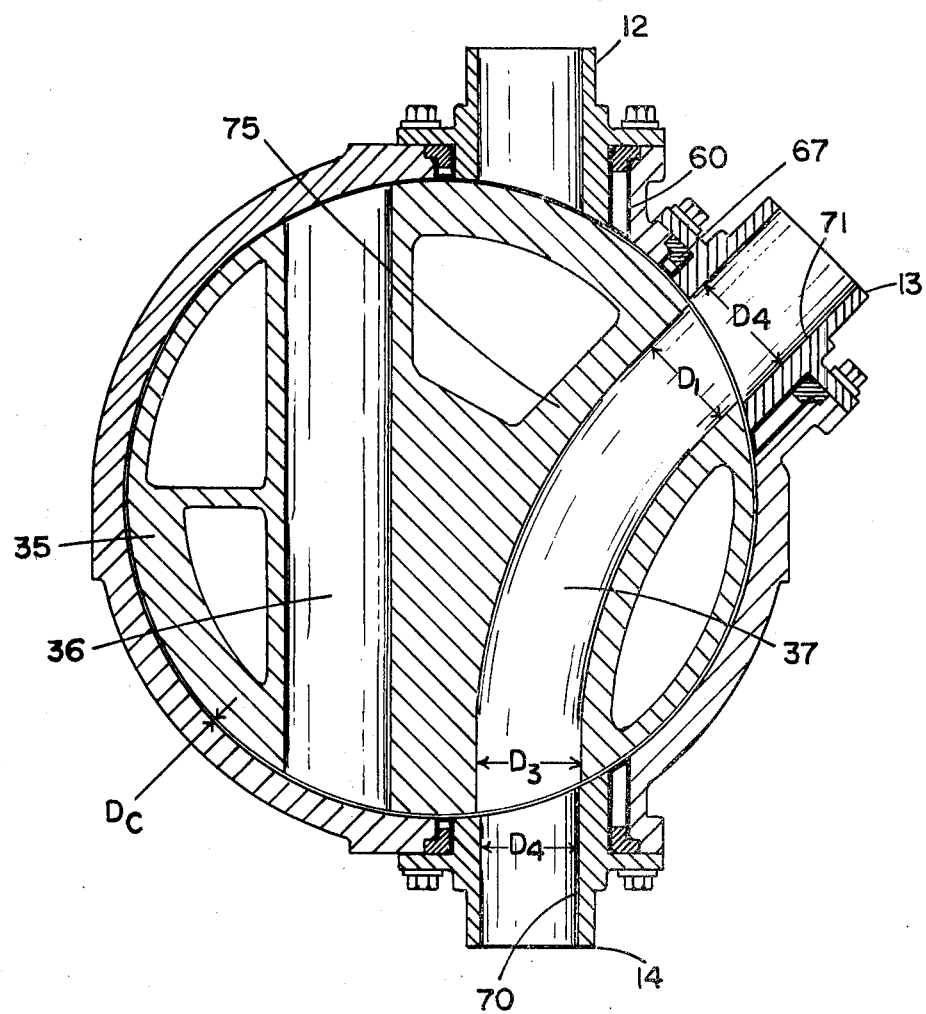
FIG. 4 is a top sectional view of my rotor diverter valve in a first operating position.

Referring to FIGS. 3 and 4, reference numeral 35 identifies the sectioned cylindrical rotor located within housing 45. Cylindrical rotor 35 has a circular converging passage 36 and a curved circular converging passage 37. Each of passages 36 and 37 are offset from the center line of rotor 35. Attached to rotor 35 is a top shaft 30 and a mounting plate 34. Attached to the underside of rotor 35 is a bottom shaft 32 and mounting plate 33. Plates 34 and 33 are securely fastened to rotor 35 through removable fasteners such as stud bolts or the like (not shown). Shafts 30 and 32 coact with plates 33 and 34 to rotatably support rotor 35 within the confines of cylindrical housing 45. Located around lower shaft 30 is a seal 53 and a circular bearing 51. Similarly located around top shaft 32 is a seal 52 and a circular bearing 50. Bearings 50 and 51 allow the operator to easily turn rotor 35 from one position to another within housing 45. To prevent binding of rotor 35 when housing 45 is under stress, bottom cover 40 has a circular lip 46 and a top cover 31 has a circular lip 47 that extends around the covers. Lips 46 and 47 coact with cylindrical housing 45 to maintain cylindrical housing 45 in proper cylindrical position and in proper location with respect to rotor 35, i.e. the coaction of lips 46 and 47 and housing 45 prevent housing 45 from deforming or bending under thermal or pressure stresses thus insuring that clearance $D_c$ (FIG. 4) is maintained between the outside diameter of rotor 35 and the inside diameter of housing 45. To minimize the area to be sealed, the clearance $D_c$ between the outside deameter of rotor 35 and the inside diameter housing 45 is kept to a minimum. A typical dimension is rotor diameter=21.90" and rotor housing=22.00" so that $D_c$ is a minimum of 0.05".

Bottom cover 40 is shown having a recessed area 41 with a slotted opening 42 therein. The purposes of slotted opening 42 is to allow material that may escape from between the outside of rotor 35 and the interior of housing 45 to discharge from unit 10.

FIG. 4 shows a cut away of rotor diverter valve 10 with inlet 14 connected to outlet 13. In the position shown in FIG. 4 fluidized material enters inlet 14 through a passage 70 of diameter $D_4$ and flows into converging circular passage 37 having a diameter $D_3$. $D_3$ is slightly larger than the diameter of passage $D_4$. The material flows through converging circular passage 37 and discharges through a reduced diameter passage $D_1$ into circular discharge passage 71 having a diameter $D_4$. The outlet diameter $D_1$ of passages 37 is smaller than inlet diameter $D_3$ of passage 37 thereby providing a passage 37 that converges from inlet to outlet while the diameter $D_4$ of inlet and outlet housing are equal. Typical dimensions are as follows: $D_4=3.826$, $D_1=3.687$, $D_3=4.062$.

It has been found that slightly converging passages reduce the amount of buildup at the junction between the rotor and the inlet or outlet as well as eliminate difficulties in obtaining precise alignment of the passages. This feature is maintained by having $D_3 > D_4$ and $D_1 < D_4$.

In the position shown in FIG. 4, material is diverted at a 45° angle to discharge through outlet 13. The outside bend of passage 37 contains a reinforced wall 75 to absorb wear from material flowing through rotor 35.

Figure 5:
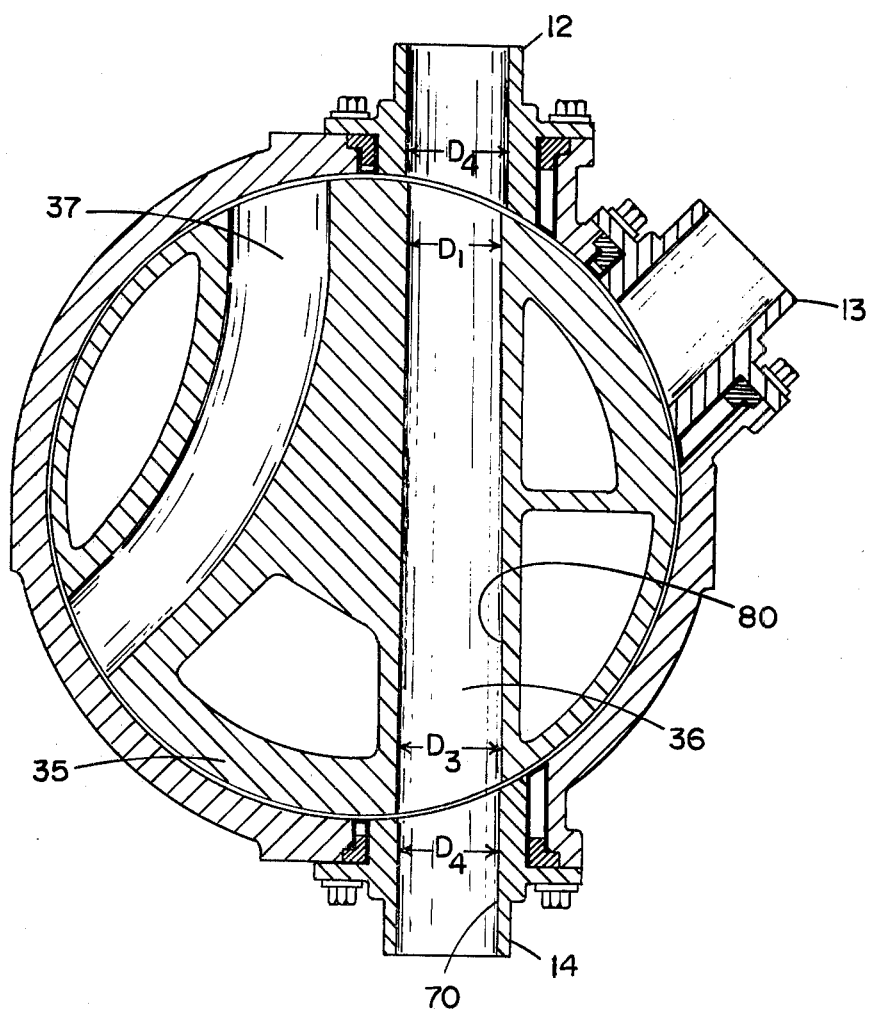
FIG. 5 is a top sectional view of my rotor diverter valve in a second operating position.

Rotor 35 contains a second operating position which is shown in FIG. 5. With rotor 35 in the position shown in FIG. 5, materials flow from inlet 14 through circular converging passage 36 and discharges through outlet 12. Passage 36 has a converging circular side wall 80. The inlet end of passage 36 has a diameter $D_3$ which is greater than $D_4$ and an outlet $D_1$ which is less than $D_4$. A further feature of the invention is that rotor diverter valve 10 always provides a seal around the unused outlet to prevent backflow into the system.

Figure 6:
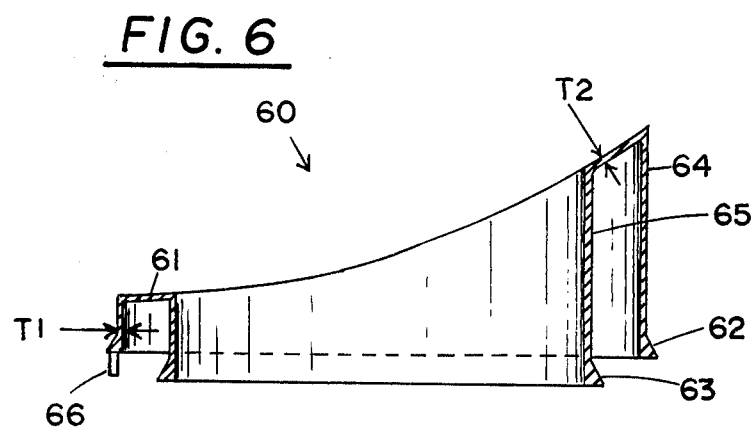
FIG. 6 is a sectional view of the seal used in my rotor diverter valve.

In order to provide an effective seal at the interface between rotor 35 and housing 45, there are provided inflatable seals 60 (FIG. 4 and FIG. 6). Inflatable seals 60 are identical on each of the inlets and outlets and hence only one will be described. Inflatable seal 60 comprises an annular end sealing surface 61 having a thickness $T_1$. Surfaces $T_2$ comprise an annular region which extends and forms pressure contact with the outside cylindrical surface of rotor 35. Seal 60 dimension $T_2$ is thicker than $T_1$. The purpose of thicker section on the contact surface is to prevent ballooning of surface 61 and allow expansion of the inflatable seals only along side walls 64 and 65. That is, when pressurized, the thinner section $T_1$ expands first thus forcing section 61 against rotor 35. This insures that there is no deforming in the sealing surface 61 and that the integrity of seal 60 remains intact even under repeated use. A further feature is that the thickness $T_2$ is greater than the clearance $D_c$ so there is a solid seal filling the gap $D_c$ between rotor 35 and housing 45.

A set of circular ridges 62 and 63 securely hold seal 60 within the confines of the housing. In order to maintain proper alignment of seal 60 with housing 45, there is provided a member 66 that fits into a matched opening in housing 45 thereby preventing rotation of seal 60 during the inflation and deflation process. To hold seals 60 in the housing, an annular ring 67 (FIG. 4) frictionally engages circular lips 62 and 63 to maintain seal 60 around the inlet.

In typical operation of seal 60 the pressure in seals 60 are decreased thus allowing the seals to contract into the sealing chamber. Next, rotor 35 is positioned with the proper passage in alignment with the inlet and outlet. If the passage is in proper alignment, limit switches 17 or 18 indicate this condition to the operator. It not, set-screw 19 or 20 could be adjusted to properly align the passage. Next, the inflatable seals 60 are inflated to form an airtight seal between rotor 35 and the inlet 14 and outlets 12 and 13 in housing 45. The rotor diverter valve is now ready for use. With the present invention rotor valve 10 can be used where a full flow design is required and in rain or snow as the top and sides are sealed to protect the rotor and the inside of the housing.

To use rotor diverter valve with a left hand output, the operator removes top cover 31 and bottom cover 40 from housing 45 and disconnects plates 33 and 34 from rotor 35. Next, the operator turns housing 45 and rotor 35 upside down and assembles top plate 34 and lower plate 33 to rotor 35. The top cover 31 and bottom cover 40 are fastened to housing 45. Valve 10 has been converted from a right hand output (FIG. 4) to a left hand output with outlet 13 on the opposite side from that shown in FIG. 4.

I claim:

1. A rotor diverter valve for directing material from a first region to a second region comprising:
    a housing, said housing having a cylindrical chamber with a cylindrical inner surface, said cylindrical chamber operable for containing a cylindrical rotor therein, a housing inlet connected to said housing for ingress of material into said housing, a first housing outlet connected to said housing for egress of material from said housing;

a second housing outlet connected to said housing for egress of material from said housing;

a cylindrical rotor having a central axis, said cylindrical rotor located in said cylindrical chamber of said housing;

a support member mounted in said housing, said support member including means for rotatably supporting said cylindrical rotor in said cylindrical chamber to thereby permit rotation of said cylindrical rotor about the central axis of said cylindrical rotor, said cylindrical rotor having a cylindrical outer peripheral surface;

a first passage located in said cylindrical rotor, said passage having an inlet located in said peripheral surface of said cylindrical rotor, said first passage having an outlet located in said peripheral surface, said first passage, said inlet and said outlet therein operable for forming a passageway from said housing inlet to said housing outlet so that when said cylindrical rotor is in a first position with said housing inlet in alignment with said inlet in said first passage and said outlet in said first passage in alignment with said housing outlet the diverter valve is operable to direct material from said housing inlet to said housing outlet through said first passage, said cylindrical rotor operable for rotation about said central axis to a second position where said inlet of said first passage and said housing inlet are not in alignment with each other to thereby prevent flow of materials into said first passage;

a second passage located in said cylindrical rotor, said second passage having an inlet located in said peripheral surface of said cylindrical rotor, said second passage having an outlet located in said peripheral surface, said second passage having a curved section that smoothly curves from said inlet on said second passage to said outlet on said second passage, said second passage, said inlet and said outlet operable for forming a curved passage from said housing inlet to said second housing outlet, said second passage having a reinforced section to absorb wear from material flowing through said second passage, arcuate sealing means for sealing the cylindrical peripheral surface of said cylindrical rotor to the cylindrical inner surface of said cylindrical chamber to thereby prevent flow of material between said cylindrical peripheral surface of said cylindrical rotor and said inner surface of said cylindrical chamber; and said arcuate sealing means have an annular arcuate inflatable seal located therearound with said annular arcuate inflatable seal having a sealing surface of thickness $T_2$ and expandable side walls of thickness $T_1$ wherein $T_2$ is $> T_1$ so that said walls expand to permit sealing of said sealing surface to said rotor, said cylindrical rotor having an outside diameter that closely mates with the inside diameter of said housing with the radial clearance between said rotor and said housing denoted by $D_c$ and whereby the thickness of said sealing surface $T_2$ is greater than $D_c$.

2. The invention of claim 1 wherein said housing inlet and said housing outlet are interchangeable.

3. The invention of claim 2 wherein said housing comprises a cylindrical housing including a top cover and a bottom cover for attachment to said cylindrical housing, said top cover and bottom cover having retaining means for maintaining the cylindrical chamber in spaced condition from the rotor.

4. The invention of claim 3 including a second passage located in said cylindrical rotor.

* * * * *

UNITED STATES PATENT OFFICE
CERTIFICATE OF CORRECTION

Patent No. 4,264,244   Dated April 28, 1981

Inventor(s) James R. Steele

It is certified that error appears in the above-identified patent and that said Letters Patent are hereby corrected as shown below:

In claim 1, line 18, after "said" (second occurrence) insert --first--;

In claim 1, line 24, before "housing" insert --first--;

In claim 1, line 28, before "housing" insert --first;

In claim 1, line 30, before "housing" insert --first--;

In claim 2, line 30, delete "outlet" and insert --outlets--.

Signed and Sealed this

Eleventh Day of August 1981

[SEAL]

Attest:

Attesting Officer

GERALD J. MOSSINGHOFF

Commissioner of Patents and Trademarks